United States Patent
Iwasaki et al.

(10) Patent No.: US 7,103,265 B2
(45) Date of Patent: Sep. 5, 2006

(54) AUTOMATIC LEVEL CONTROL FOR CHANGING AUDIO MODE OF DIGITAL VIDEO RECORDING APPARATUS

(75) Inventors: Shiro Iwasaki, Iizuka (JP); Kazuhiko Nakamura, Hirakata (JP); Hideki Fukuda, Nara (JP); Kojiro Kawasaki, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1114 days.

(21) Appl. No.: 09/891,944

(22) Filed: Jun. 26, 2001

(65) Prior Publication Data
US 2002/0001457 A1    Jan. 3, 2002

(30) Foreign Application Priority Data
Jun. 28, 2000   (JP)   ............................. 2000-194205

(51) Int. Cl.
*H04N 5/91*   (2006.01)
*H04N 7/04*   (2006.01)
*H04N 7/52*   (2006.01)

(52) U.S. Cl. ..................... 386/104; 386/97; 386/112

(58) Field of Classification Search .................. 386/68, 386/70, 94–97, 99, 108, 109, 111, 112, 124; 369/2, 3; 360/8, 15, 20, 32, 60, 80; 348/423, 348/483, 485, 632, 738
See application file for complete search history.

(56) References Cited

U.S. PATENT DOCUMENTS 5,621,840 A * 4/1997 Kawamura et al. ........... 386/68
5,915,066 A * 6/1999 Katayama ..................... 386/70

FOREIGN PATENT DOCUMENTS

| EP | 0 371 717 B1 | 6/1990 |
| JP | 63-244366 | 10/1988 |
| JP | 5-003441 A1 | 1/1993 |
| JP | 7-115605 A1 | 5/1995 |

OTHER PUBLICATIONS

Patent Abstracts of Japan for JP 63-244366 published on Oct. 11, 1988.

* cited by examiner

*Primary Examiner*—Thai Tran
*Assistant Examiner*—Mishawn Dunn
(74) *Attorney, Agent, or Firm*—Darby & Darby (57) ABSTRACT

A digital video recording apparatus reduces the audio output level before and during changes in an audio encoding condition (stereo, monaural, etc.). One embodiment of the digital video recording apparatus multiplexes video and audio signals to produce an output stream. A video recording control means controls the apparatus according to user input and design.

21 Claims, 4 Drawing Sheets

AUTOMATIC LEVEL CONTROL FOR CHANGING AUDIO MODE OF DIGITAL VIDEO RECORDING APPARATUS

BACKGROUND OF THE INVENTION

1. Field of the Invention

This invention relates to a digital video recording apparatus which encodes a digital video signal and an audio signal and employs an audio encoding control technique when an audio encoding condition is changed in a digital video recording apparatus.

2. Description of the Related Art

In recent years, a digital video recording apparatus, which digitally encodes a video and an audio signal and stores both, has come into practical use as the storage capacity of optical and hard disks has increased.

The audio signal may be classified into a stereo (two channels), a monaural (one channel), and a multiplex (main voice: one channel+sub-voice: one channel) sound signal. An audio signal has 5.1 channels in the standard of Dolby AC-3 or linear PCM. In a digital audio stream, picture/sound recording time can be controlled, or sound quality, when reproduced, may be controlled by changing an encoding bit rate.

Figure 4:
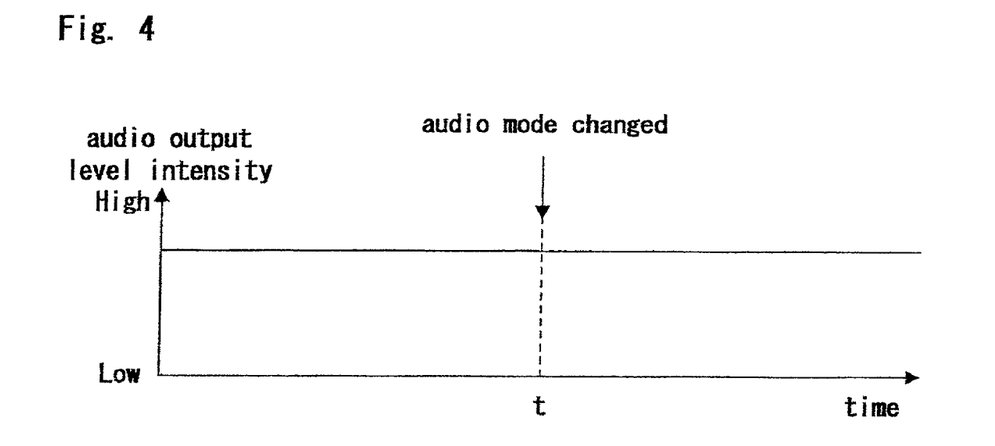
FIG. 4 is a graph showing a time-dependent change in audio output level intensity when an audio mode is changed in a conventional digital video recording apparatus.

Referring now to FIG. 4, a time-dependent change is shown in audio output level intensity when such an encoding condition (stereo, monaural, multiplex, number of channels, and bit rate) is changed in a conventional digital video recording apparatus. Here, the horizontal axis indicates time, and the vertical axis indicates a constant output intensity of an audio level.

When the audio encoding condition is changed at a time t in the conventional digital video recording apparatus, the condition is changed while keeping the audio output level intensity fixed both before and after the change.

The present inventors have found that the audio signal becomes discontinuous before time t and after time t. When the audio signal is reproduced, an undesirable cacophonous noise, which is called a "puff sound", is generated when the audio encoding condition (stereo, monaural, multiplex, number of channels, and bit rate) is changed in the digital video recording apparatus. The related art does not take measures to prevent this kind of noise.

OBJECTS AND SUMMARY OF THE INVENTION

It is an object of the present invention to provide a digital video recording apparatus capable of reducing a cacophonous noise as described above.

Briefly stated, the present invention relates to a digital video recording apparatus which reduces audio noise occurring during normal reproduction when an audio encoding condition (stereo, monaural, etc.) changes. One embodiment of the digital video recording apparatus includes a video encoding means, an audio mode judging means, an audio encoding means, a system encoding means for multiplexing encoded video/audio signals, and a video recording control means for controlling them. When the audio mode information changes, the video recording control means gradually lowers an audio output level, then changes an audio encoding mode, and thereafter gradually raises the audio output level again to prevent undesirable audio noise.

According to an embodiment of the present invention there is provided a digital video recording apparatus, comprising: means for producing a digitally encoded audio stream, means for detecting a change in an audio mode, and means for reducing an audio output level beginning before that change, and lasting until after that change, to produce an output audio signal.

According to another embodiment of the present invention there is provided a digital video recording apparatus, further comprising: means for multiplexing a digitally encoded video signal to product an output video signal, and means for multiplexing that output audio signal and that output video signal to produce an output system stream.

According to another embodiment of the present invention there is provided a digital video recording apparatus, comprising: video encoding means for compressing and digitally encoding a video signal, audio encoding means for digitally encoding an audio signal, system encoding means for multiplexing that video signal with that audio signal to produce a system stream output, and control means for controlling that audio encoding means to lower an audio output level before an audio encoding bit rate is changed, and restoring that audio output level after that audio encoding bit rate is changed.

According to an embodiment of the present invention there is provided a digital video recording apparatus, comprising: a video encoding means for compressing and encoding a video signal input, an audio mode judging means for judging an audio mode of an audio signal input, an audio encoding means for encoding the audio signal input, a system encoding means for multiplexing an encoded video-encoded stream and an encoded audio-encode-stream and generating a system stream, and a video recording control means for controlling the video encoding means, the audio encoding means, and the system encoding means, wherein the video recording control means controls the audio encoding means so that, when data of the audio mode that has been judged by the audio mode judging means changes, an audio output level is lowered to a first desired condition, an audio encoding condition is then changed, and thereafter the audio output level is raised again to a second desired condition.

According to another embodiment of the present invention there is provided a digital video recording apparatus, wherein: the data of the audio mode includes at least one of a difference in stereo sounds, monaural sounds, multiplex sounds, number of channels, and an encoding bit rate.

According to another embodiment of the present invention there is provided a digital video recording apparatus, wherein: the video recording control means controls the audio encoding means and provides that, when the audio mode changes, the audio output level is gradually lowered to zero, and the audio encoding condition is then changed, and thereafter the audio output level is gradually raised to an original level again.

According to another embodiment of the present invention there is provided a digital video recording apparatus, wherein: the data of the audio mode includes at least one of a difference in stereo sounds, monaural sounds, multiplex sounds, number of channels, and an encoding bit rate, and the video recording control means controls the audio encoding means and provides that, when the audio mode changes, the audio output level is gradually lowered to zero, and the audio encoding condition is then changed, and thereafter the audio output level is gradually raised to an original level again.

According to another embodiment of the present invention there is provided a digital video recording apparatus, comprising: video encoding means for compressing and encoding a video signal input, audio encoding means for encoding an audio signal input, system encoding means for multiplexing an encoded video-encode-stream and an encoded audio-encode-stream and generating a system stream output, and video recording control means for controlling the video encoding means, the audio encoding means, and the system encoding means, wherein the video recording control means controls the audio encoding means so that, when an audio encoding condition changes, an audio output level is gradually lowered, and an audio encoding bit rate is then changed, and thereafter the audio output level is raised again.

According to another embodiment of the present invention there is provided a digital video recording apparatus, wherein: the audio encoding condition includes one of a difference in stereo sounds, monaural sounds, and multiplex sounds of audio encoding, number of channels, and an encoding bit rate.

According to another embodiment of the present invention there is provided a digital video recording apparatus, wherein: the video recording control means controls the audio encoding means so that, when the audio encoding condition changes, the audio output level is gradually lowered to zero, and an audio mode is then changed, and thereafter the audio output level is gradually raised to an original level again.

According to another embodiment of the present invention there is provided a digital video recording apparatus, wherein: the audio encoding condition includes one of a difference in stereo sounds, monaural sounds, and multiplex sounds of audio encoding, number of channels, and an encoding bit rate, and the video recording control means controls the audio encoding means so that, when the audio encoding condition changes, the audio output level is gradually lowered to zero, and an audio mode is then changed, and thereafter the audio output level is gradually raised to an original level again.

According to another embodiment of the present invention there is provided a digital video recording apparatus, comprising: a video encoding means for compressing and encoding a video signal input and outputting a encoded video-encode stream, an audio mode judging means for judging an audio mode of an audio signal input and producing an audio mode information, an audio encoding means for encoding an audio signal input and outputting an encoded audio-encode stream, a system encoding means for multiplexing the encoded video-encoded stream and the encoded audio-encode stream and generating a system stream output, a video recording control means for controlling the video encoding means, the audio encoding means, and the system encoding means, wherein the video recording control means controls the audio encoding means and provides that, when data of the audio mode changes, an audio output level is lowered to zero, and an audio encoding condition is then changed, and thereafter the audio output level is raised to an original level again, and the data of the audio mode includes at least one of a difference in stereo sounds, monaural sounds, multiplex sounds, number of channels, and an encoding bit rate.

Further, according to another aspect of the present invention, the present invention is characterized in that, in a digital video recording apparatus including a video encoding means for compressing and encoding an video signal input, an audio encoding means for encoding an audio signal input, a system encoding means for multiplexing an encoded video-encode-stream and an encoded audio-encode-stream and generating a system stream, and a video recording control means for controlling a start of video recording, a stop of video recording, a temporary stop of video recording, and a release of a temporary stop of a video recording of the video encoding means, of the audio encoding means, and of the system encoding means, wherein the video recording control means controls the audio encoding means so that, when an audio encoding condition is changed, an audio output level is gradually lowered, an audio encoding condition is then changed, and thereafter the audio output level is gradually raised again.

With these structures, the discontinuity of an audio signal can be caused to minimize, adapt, contribute to a desired audio signal or disappear, and a cacophonous noise occurring when reproduced can be reduced.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
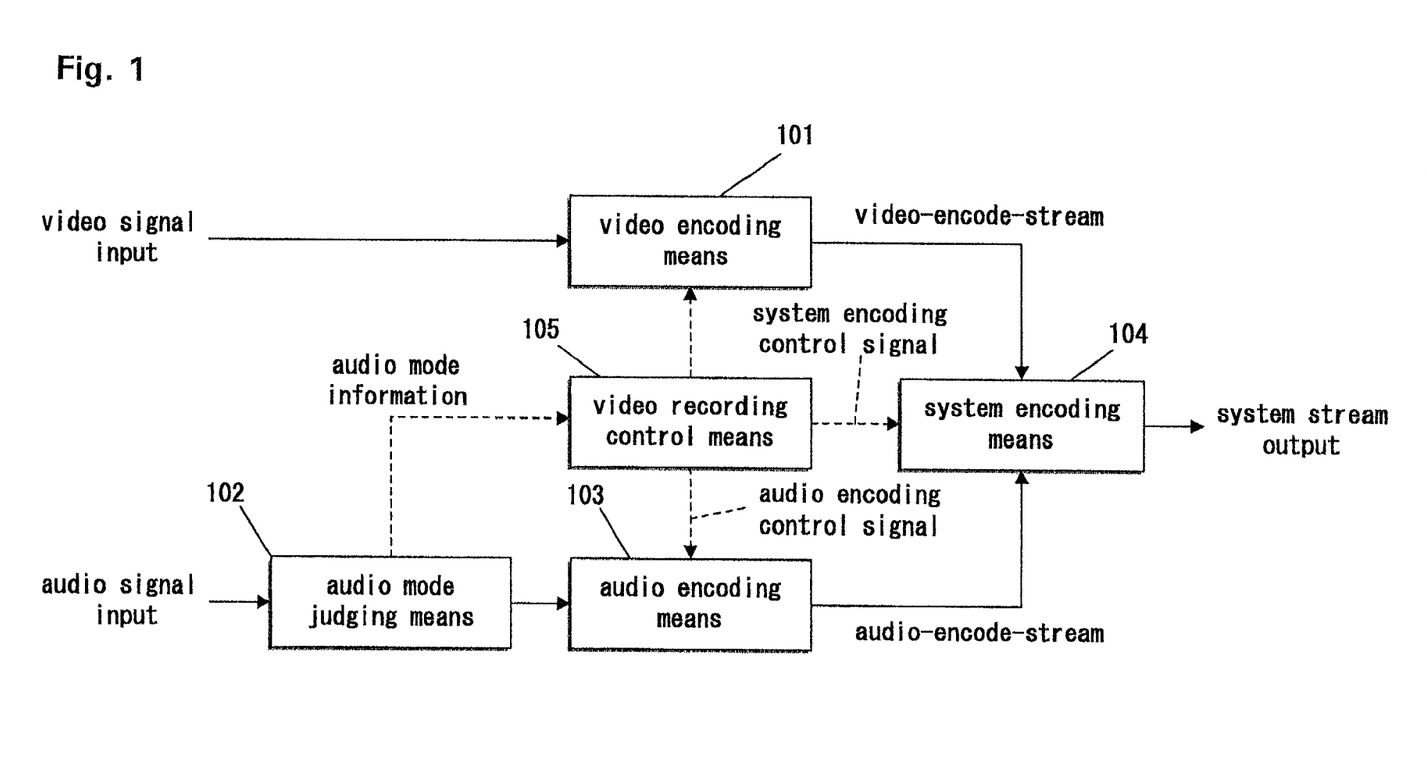
FIG. 1 is a block diagram of a digital video recording apparatus according to a first embodiment of the present invention.

Referring now to FIG. 1, a video encoding means 101 compresses and encodes video signal input. An audio mode judging means 102 determines the audio mode of audio signal input.

An audio encoding means 103 encodes the audio signal input. A system encoding means 104 multiplexes an encoded video-encode-stream and an encoded audio-encode-stream, and generates a system stream. A video recording control means 105 controls a start of video recording, a stop of video recording, a temporary stop of video recording, and a release of the temporary stop of video recording of video encoding means 101, of audio encoding means 103, and of system encoding means 104.

During operation, video recording control means 105 controls audio encoding means 103 so that, when audio mode information (stereo, monaural, multiplex, number of channels, and bit rate) for the audio signal input that has been determined by audio mode judging means 102 changes, an audio output level is gradually lowered, and an audio encoding condition is then changed, and thereafter the audio output level is gradually raised again.

Figure 2:
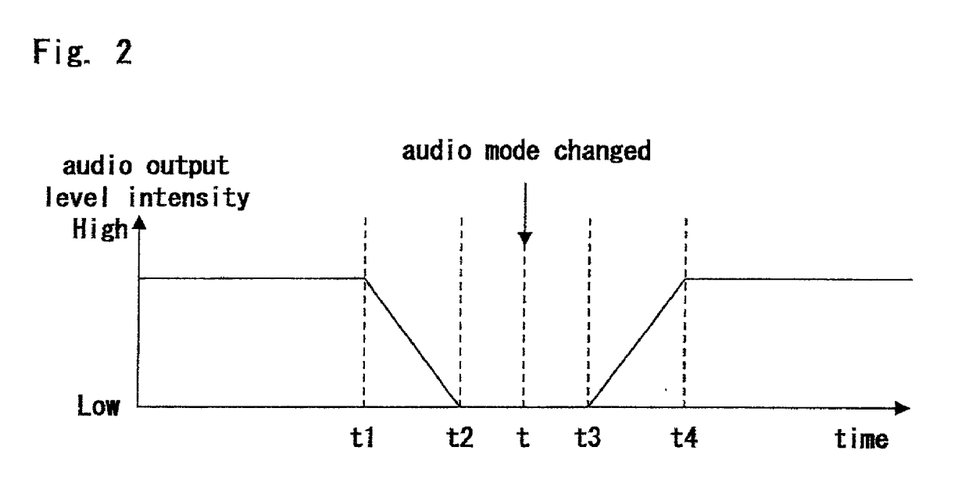
FIG. 2 is a graph showing a time-dependent change in audio output level intensity when an audio encoding condition is changed in the digital video recording apparatus according to the first and second embodiments of the present invention.

Additionally referring now to FIG. 2, where a time-dependent change in audio output level intensity changes when an audio mode (stereo, monaural, multiplex, number of channels, and bit rate) is changed in the digital video recording apparatus of the present invention.

Where the audio mode is changed, video recording control means 105 operates and lowers the audio output level intensity to zero from time t1 to time t2, and then changes the audio mode at time t. Thereafter, video recording control means 105 raises the audio output level to the original intensity from time t3 to time t4.

In the description of this first embodiment, the stereo, the monaural, the multiplex, the number of channels, and the bit rate were shown as audio mode information for the audio signal input determined by the audio mode judging means 102. However, the present invention is not limited to these elements, and, in the audio mode judging means 102, any one of these elements or a combination of them may be used as the audio mode information for the audio signal input.

Further, in this first embodiment as noted above, a case was described in which the audio output level intensity is lowered to zero from time t1 to time t2 in video recording control means 105 when the audio mode information for the audio signal input is changed. However, the audio output level intensity is not limited to zero at this time, and, if it is less than the audio output level intensity before time t1, the noise can be reduced at a level that is not so bothersome.

It is to be understood, that all that is needed is to monotonically lower the audio output level intensity from time t1 to time t2, and to monotonically raise the audio output level intensity from time t3 to time t4, and, accordingly, the output level intensity is not necessarily required to straightly or constantly change from time t1 to time t2 or from time t3 to time t4 as shown in FIG. 2. It is to be understood, that the audio output level intensity is managed to benefit the overall production needs during operation.

Figure 3:
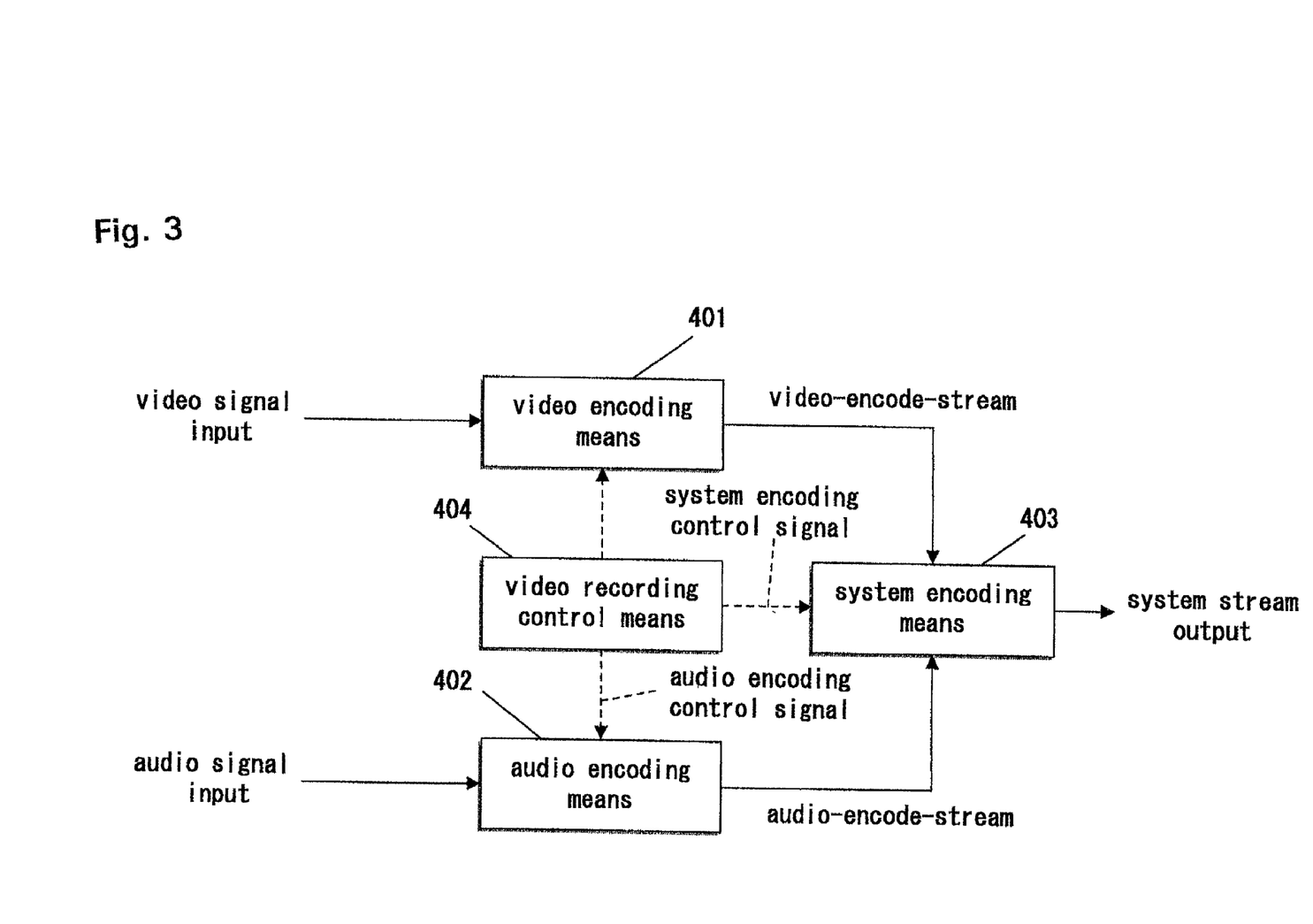
FIG. 3 is a block diagram of the digital video recording apparatus according to the second embodiment of the present invention.

Referring additionally now to FIG. 3, another embodiment of a digital video recording apparatus according to the present invention is shown. Here, a video encoding means 401 receives and compresses and encodes video signal input. An audio encoding means 402 receives and encodes audio signal input.

A system encoding means 403 multiplexes an encoded video-encode-stream and an encoded audio-encode-stream, and generates a system stream output. A video recording control means 404 controls a start of video recording, a stop of video recording, a temporary stop of video recording, and a release of the temporary stop of video recording of video encoding means 401, of audio encoding means 402, and of system encoding means 403.

In the digital video recording apparatus constructed as above, video recording control means 404 controls audio encoding means 402 so that, when an audio encoding condition (coding modes [stereo, monaural, multiplex], number of channels, and bit rate) changes, an audio output level is gradually lowered, and an audio encoding mode is then changed, and thereafter the audio output level is gradually raised again.

It is to be understood, that as mentioned above and similarly shown in FIG. 2, a time-dependent change in audio output level intensity changes when the audio encoding condition (coding modes [stereo, monaural, multiplex], number of channels, and bit rate) is changed in the digital video recording apparatus of the present invention. In the second embodiment, the audio output level intensity is time-dependently changed as in the first embodiment.

Specifically it is to be understood, that when the audio encoding condition is changed, video recording control means 404 lowers the audio output level intensity to 0 from time t1 to time t2, and then changes the audio encoding condition at time t, and thereafter raises the audio output level to the original intensity from time t3 to time t4.

In the description of the second embodiment, the coding modes [stereo, monaural, and multiplex], the number of channels, and the bit rate are audio-encoding conditions in video recording control means 404. However, it is to be understood that the present invention is not limited to only these elements, and, in video recording control means 404, any one of these elements or a combination of the elements may be used as the audio encoding condition.

It is to be further understood, that in the second embodiment, the audio output level intensity is lowered to 0 from time t1 to time t2 in video recording control means 404 when the audio encoding condition is changed. However, the audio output level intensity is not required to be lowered to 0 and may only be reduced to a level greater than 0 that is determined by an operator to be desirable. Further, since the now-changed audio output level intensity is less than the audio output level intensity before time t1, the noise is reduced to a level that is not bothersome.

It is to be understood, that all that is needed is to monotonically lower the audio output level intensity from time t1 to time t2, and to monotonically raise the audio output level intensity from time t3 to time t4 in the same way as in the first embodiment, and, accordingly, the output level intensity is not necessarily required to straightly change from time t1 to time t2 or from time t3 to time t4.

It is to be understood that when the audio mode changes, the information or data of the audio mode changes and is detectable by the invention.

It is to be understood, that the video recording control means controls at least a start of video recording, a stop of video recording, a temporary stop of video recording, and a release of the temporary stop of a video recording of the video encoding means, of the audio encoding means, and of the system encoding means.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the scope of this invention as defined in the following claims. In the claims, means-plus-function clauses are intended to cover the structures described or suggested herein as performing the recited function and not only structural equivalents but also equivalent structures. Thus although a nail and screw may not be structural equivalents in that a nail relies entirely on friction between a wooden part and a cylindrical surface whereas a screw's helical surface positively engages the wooden part, in the environment of fastening wooden parts, a nail and a screw may be equivalent structures.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A digital video recording apparatus, comprising:
   an video encoding unit operable to compress and digitally encode a video signal input;
   an audio encoding unit operable to digitally encode an audio signal input; and
   an video recording control unit operable to control said audio encoding unit,
   wherein the video control unit controls said audio encoding unit so that, when one of an audio mode and an audio encoding condition changes, an audio output level is gradually lowered, and thereafter said audio output level is gradually raised again.

2. A digital video recording apparatus, according to claim 1, wherein:
said video recording control unit is further operable to control said audio encoding unit so that, when at least one of the audio mode and the audio encoding condition changes, the audio output level is gradually lowered, the audio encoding conditions is then changed, and thereafter the audio output level is gradually raised again.

3. A digital video recording apparatus, according to claim 1, wherein:
said video recoding control unit controls said audio encoding unit so that when one of the audio mode and the audio encoding condition changes, said audio output level is lowered to zero, and said audio encoding condition is then changed, and thereafter said audio output level is raised to an original level again.

4. A digital video recording apparatus, according to claim 1, wherein:
said video recording control unit controls said audio encoding unit so that, when one of said audio mode and said audio encoding condition changes, said audio output level is lowered to a first desired condition, and said audio encoding condition is then changed, and thereafter said audio output level is raised to second desired condition again.

5. A digital video recording apparatus, according to claim 1, wherein:
said audio mode includes a difference in at least one of stereo sounds, monaural sounds, multiplex sounds, number of channels, and encoding bit rate.

6. A digital video recording apparatus, according to claim 1, wherein:
said audio encoding condition change includes a difference in at least one of stereo sounds, monaural sounds, multiplex sounds, number of channels, and encoding bit rate.

7. A digital video recording apparatus, according to claim 1, further comprising:
audio mode judging unit operable to judge one of the audio mode and the audio encoding condition.

8. A digital video recording apparatus, according to claim 1, wherein:
said video encoding unit outputs an encoded video-encoded stream.

9. A digital video recording apparatus according to claim 1, wherein:
said audio encoding unit outputs an encoded audio-encode stream.

10. A digital video recording apparatus, according to claim 1, further comprising:
system encoding unit operable to multiplex the encoded vide-encode stream and the encoded audio-encode stream.

11. A digital video recording apparatus, according to claim 10, wherein:
said system encoding unit is further operable to generate a system stream.

12. A digital video recording apparatus, comprising:
video encoding means for compressing and digitally encoding a video signal;
audio encoding means for digitally encoding an audio signal;
system encoding means for multiplexing said video signal with said audio signal to produce a system stream output; and
control means for controlling said audio encoding means to lower an audio output level before an audio encoding bit rate is changed, and restoring said audio output level after said audio encoding bit rate is changed.

13. A digital video recording apparatus, comprising:
video encoding means for compressing and encoding a video signal input;
audio mode judging means for judging an audio mode of an audio signal input;
audio encoding means for encoding said audio signal input;
system encoding means for multiplexing an encoded video-encoded stream and an encoded audio-encode-stream and generating a system stream;
video recording control means for controlling said video encoding means, said audio encoding means, and said system encoding means, and said video recording control means controls said audio encoding means to permit, when data, of said audio mode that has been judged by said audio mode judging means, changes, an audio output level to lower to a first desired condition, an audio encoding condition to change, and thereafter said audio output level to raise again to a second desired condition.

14. A digital video recording apparatus, according to claim 13, wherein:
said change of said data of said audio mode includes a difference in at least one of stereo sounds, monaural sounds, multiplex sounds, number of channels, and encoding bit rate.

15. A digital video recording apparatus, according to claim 14, wherein:
said video recording control means controls said audio encoding means and provides that, when said audio mode changes, said audio output level is lowered to zero, and said audio encoding condition is then changed, and thereafter said audio output level is raised to an original level again.

16. A digital video recording apparatus, according to claim 13, wherein:
said change of said data of said audio mode includes a difference in at least one of stereo sounds, monaural sounds, multiplex sounds, number of channels, and encoding bit rate; and
said video recording control means controls said audio encoding means and provides that, when said audio mode changes, said audio output level is lowered to zero, and said audio encoding condition is then changed, and thereafter said audio output level is raised to an original level again.

17. A digital video recording apparatus, comprising:
video encoding means for compressing and encoding a video signal input;
audio encoding means for encoding an audio signal input;
system encoding means for multiplexing an encoded video-encode stream and an encoded audio-encode stream and generating a system stream output;
video recording control means for permitting control of said video encoding means, said audio encoding means, and said system encoding means; and
said video recording control means controls said audio encoding means to permit, when an audio encoding condition changes, an audio output level to lower, and an audio encoding bit rate is then changed, and restoring said audio output level afterward.

18. A digital video recording apparatus, according to claim 17, wherein:
said change of said audio encoding condition includes a difference in at least one of stereo sounds, monaural sounds, and multiplex sounds of audio encoding, number of channels, and encoding bit rate.

19. A digital video recording apparatus, according to claim 18, wherein:
said video recording control means controls said audio encoding means so that, when said audio encoding condition changes, said audio output level is lowered to zero, and an audio mode is then changed, and thereafter said audio output level is raised to an original level again.

20. A digital video recording apparatus, according to claim 17, wherein:
said audio encoding condition change includes a difference in at least one of stereo sounds, monaural sounds, and multiplex sounds of audio encoding, number of channels, and encoding bit rate; and
said video recording control means controls said audio encoding means so that, when said audio encoding condition changes, said audio output level is lowered to zero, and an audio mode is then changed, and thereafter said audio output level is raised to an original level again.

21. A digital video recording apparatus comprising:
video encoding means for compressing and encoding a video signal input and outputting a encoded video-encode stream;
audio mode judging means for judging an audio mode of an audio signal input and producing an audio mode information;
audio encoding means for encoding an audio signal input and outputting an encoded audio-encode stream;
system encoding means for multiplexing said encoded video-encoded stream and said encoded audio-encode stream and generating a system stream output;
video recording control means for controlling said video encoding means, said audio encoding means, and said system encoding means, wherein said video recording control means controls said audio encoding means and provides that, when data of said audio mode changes, an audio output level is lowered to zero, and an audio encoding condition is then changed, and thereafter said audio output level is raised to an original level again; and
said data of said audio mode includes a difference in at least one of stereo sounds, monaural sounds, multiplex sounds, number of channels, and an encoding bit rate.

* * * * *

UNITED STATES PATENT AND TRADEMARK OFFICE
CERTIFICATE OF CORRECTION

PATENT NO. : 7,103,265 B2
APPLICATION NO. : 09/891944
DATED : September 5, 2006
INVENTOR(S) : Shiro Iwasaki et al.

It is certified that error appears in the above-identified patent and that said Letters Patent is hereby corrected as shown below:

In the Drawings:

Sheet 4 of 4, Above "Fig. 4" insert -- Prior Art --.

Signed and Sealed this

Fifth Day of December, 2006

JON W. DUDAS
*Director of the United States Patent and Trademark Office*